United States Patent
Reda et al.

(10) Patent No.: US 6,678,067 B1
(45) Date of Patent: Jan. 13, 2004

(54) AUTOMATED DOCUMENT INSPECTION SYSTEM

(75) Inventors: James R. Reda, Rochester, NY (US); Westly M. Perdue, Fairport, NY (US)

(73) Assignee: Videk, Inc., Rochester, NY (US)

( * ) Notice: Subject to any disclaimer, the term of this patent is extended or adjusted under 35 U.S.C. 154(b) by 0 days.

(21) Appl. No.: 09/286,773

(22) Filed: Apr. 6, 1999

(51) Int. Cl.[7] .............................................. G06F 15/00
(52) U.S. Cl. ...................................... 358/1.14; 358/1.5
(58) Field of Search ........................ 358/1.1, 1.5, 1.12, 358/1.13, 1.14, 1.15, 1.16, 1.17

(56) References Cited

U.S. PATENT DOCUMENTS

| | | |
|---|---|---|
| 4,685,139 A | 8/1987 | Masuda et al. |
| 4,736,446 A | 4/1988 | Reynolds et al. |
| 4,882,764 A | 11/1989 | Reynolds et al. |
| 4,885,785 A | 12/1989 | Reynolds et al. |
| 5,058,175 A | 10/1991 | Aso |
| 5,125,037 A | 6/1992 | Lehtonen et al. |
| 5,138,667 A | 8/1992 | Roch et al. |
| 5,649,026 A | 7/1997 | Heins, III .................... 382/175 |
| 5,734,723 A | 3/1998 | Windel et al. ................. 380/55 |
| 5,768,132 A | 6/1998 | Cordery et al. .......... 364/464.2 |
| 5,862,243 A * | 1/1999 | Baker et al. ................. 382/101 |
| 5,912,979 A | 6/1999 | Gavrilos ...................... 382/101 |
| 5,974,147 A | 10/1999 | Cordery et al. ............... 380/25 |
| 6,023,526 A | 2/2000 | Kondo et al. ............... 382/165 |
| 6,064,995 A | 5/2000 | Sansone et al. ............. 705/410 |

OTHER PUBLICATIONS

"Meeting the Demanding Pace of Business" OCÉ Printing Systems USA, Inc. product brochure, The Océ Page Stream Printers, Mar. 1997.

"Enterprise Message Management Solutions, Building the Automated Document Factory" Janice Anderson, Manager, Technical Marketing, Pitney Bowes Production Mail, Jun. 24, 1998.

* cited by examiner

Primary Examiner—Mark Wallerson
(74) Attorney, Agent, or Firm—Eugene Stephens & Associates

(57) ABSTRACT

A new method and system applying the method inspect printed documents that have regions of variable content, the regions having variable locations from document to document in a print job, to ensure that predetermined criteria are met. The locations of the regions of variable content are determined by monitoring a print datastream, and the locations are used to analyze images of the regions of variable content. The images are captured by an optical imaging system mounted in a printer, print media out equipment, a finishing system, or other appropriate location with a suitable view of the printed documents. If a document does not meet its specific predetermined criteria, for example, if an account number does not match the desired account number for that document, then the inspection system takes an error notification action ranging from simply logging the error in a log file to removing the document to stopping the printer.

37 Claims, 4 Drawing Sheets

AUTOMATED DOCUMENT INSPECTION SYSTEM

TECHNICAL FIELD

The invention relates to on-the-fly automated document inspection and optical character recognition. More specifically, the invention relates to document quality control systems and methods that examine particular regions of documents.

BACKGROUND OF THE INVENTION

Today's digital printing systems are capable of printing documents that include regions of variable content, such as checks, bills, and advertising form letters, at very high rates. The process is similar to a more complex, large-scale, high-speed mail- or print-merge as can be performed with many of today's word processors and databases. As a result of the high speeds at which these documents are printed, an error in one document of a print job can create a cascade of errors in subsequent documents. Depending on the nature of the errors, the entire print job following the first erroneous document might have to be scrapped if the error were undetected, which could be very costly. Thus, document inspection systems have been developed to check the regions of variable content to be sure the appropriate information is being printed in a given document.

Documents whose regions of variable content appear in the same location from document to document in a print job are adequate for the purposes of those who create and use them. However, there is a desire in the industry to run print jobs including documents that have variable content in different locations from document to document. This provides much more flexibility in the creation of form letters, printing of bills and statements, and the like. This also allows the inclusion of documents of very different types in the same print job. For example, a utility bill could be printed immediately after an advertising form letter, which could be followed by a bank statement. With such flexibility, a printing system could be connected to a network, such as a wide area network (WAN) or the Internet, to receive documents from a wide variety of clients for printing on demand. However, current document inspection systems are incapable of handling inspection of documents whose variable content appears in different locations from document to document in a print job.

Current systems check documents whose regions of variable content appear in the same locations from document to document in a print job. They work well, and the documents produced by high-speed printing systems are adequate for the needs of those who create them; but the documents are inflexible and, in the case of form letters, are impersonal. Thus, the printing of documents including regions of variable content in different locations from document to document in a print job cannot be automatically inspected using current technology and is currently somewhat risky since there is no easy way to prevent potentially costly printing errors.

SUMMARY OF THE INVENTION

Our inventive method and apparatus overcome the limitations of currently available document inspection systems by allowing inspection of regions of variable content whose locations vary from document to document in a print job. The location of a region under inspection of a document is determined, and an optical imaging system captures an image of the region under inspection. The image can be of the region under inspection alone, in which case the location of the region under inspection is sent to the optical imaging system prior to image capture. Alternatively, the optical imaging system can capture the entire document and the location of the region under inspection can be used to extract the relevant portion of the document image for analysis. The analysis of the region under inspection determines whether the region under inspection meets predetermined criteria. If the predetermined criteria are not met, then a discrepancy notation action can be taken. Depending on the type and degree of the discrepancy, the printing system can be stopped, the failure to meet the predetermined criteria can be logged and the printing system allowed to continue, the document that is erroneous can be diverted to a scrap pile, or another appropriate action can be taken. The predetermined criteria can include print density, other characteristics of the printing, and desired content of the region. Any of these criteria can be document specific.

The optical imaging system is preferably mounted in a printer of a digital printing system. However, the optical imaging system can also be mounted in a finishing system, or another location where it has access to the printed document.

DESCRIPTION OF THE INVENTION

Figure 1:
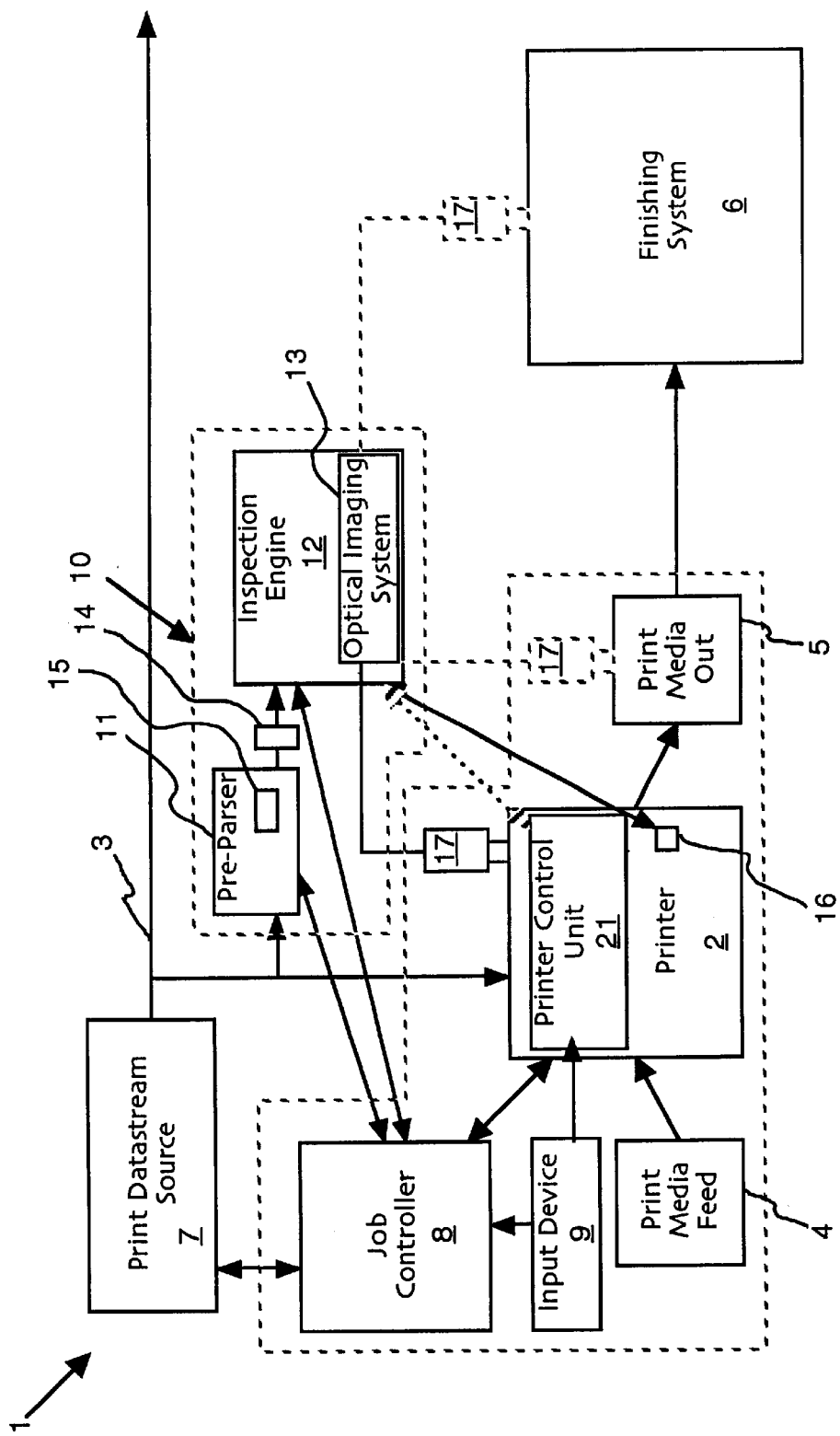
FIG. 1 is a schematic of our inspection system implemented in a high-speed digital printing system connected to a network and sending printed documents to a finishing system.

The invention is a document inspection system 10 that will preferably be used in an automated document printing system 1 as shown schematically in FIG. 1. Such a printing system 1 typically includes a printer 2 that receives a print datastream 3 and prints documents from data carried in the print datastream 3. It should be understood that our inspection system 10 can also use data files including print data, such as a POSTSCRIPT file, instead of accessing a print datastream. The documents are printed on print media that is fed to the printer 2 by print media feed equipment 4. On the output side of the printer, the printed documents are handled by print media out equipment 5, such as a document handler. The print media out equipment 5 can simply receive and sort or store the printed documents. Alternatively, the print media out equipment 5 can send the printed documents to a finishing system 6 that can perform tasks such as separating, collating, and/or folding the documents and inserting them into envelopes for mailing. Other types of print media out equipment 5 can also be used subject to their ability to provide a suitable location for an image capture device as set forth below.

The print datastream 3 is generated by a print datastream source 7, such as a computer workstation or a mainframe computer connected to a computer network to which the printing system 1 is also connected. A print server or other job controller 8 of the printing system 1 receives the print datastream 3. The job controller 8 can manage print job queues, reprint or restart print jobs, manage fonts and forms, provide connectivity of the printing system 1 to a network, and communicate print job and printer status to a system operator and/or network users. Examples of print datastreams 3 that might be handled by the print server or other job controller 8 are DJDE, METACODE, and POSTSCRIPT.

The printing system is controlled by an operator via an input device 9, such as a touchscreen control panel. Messages from the print server can also be displayed on the input device. The input device 9 allows the operator to communicate with the printer control unit 21, such as a scalable raster architecture (SRA) controller, that uses the received print datastream to print documents according to the operator's instructions. Input devices other than a touchscreen control panel can also be used if such an input device is even desired. Remote control of the printing system is also possible, such as from a workstation set up on a network to which the printing system is connected.

Our document inspection system includes a pre-parser 11, an inspection engine 12, and an optical imaging system 13 that is preferably at least partially included in the inspection engine. The pre-parser 11 is responsive to the job controller 8 and receives the print datastream 3. It filters out information that is relevant and useful to the inspection engine and sends the pre-parsed information 14 to the inspection engine 12. The pre-parsed information 14 preferably includes the location of a region under inspection of each printed document as well as information about what the desired content of the region under inspection should be. While we refer to a single region under inspection for each printed document in our exemplary embodiment, our invention also contemplates the inspection of plural regions under inspection for each document and is not limited to a single region under inspection for each document by this description. The pre-parser 11 includes a determiner 15 that determines the location of the region under inspection using, for example, flags in the print datastream and uses the region's position to extract the region's desired content from the print datastream. Flags in the print datastream can be inserted by document creation software at the time of creation or printing using a routine written into the software or by using an add-on, such as a plug-in; or the flags can be inserted in another suitable fashion.

As with the pre-parser 11, the inspection engine is responsive to the job controller 8. The inspection engine 12 also receives the pre-parsed information 14 from the pre-parser 11, preferably including document position information. The job controller 8 and/or document position sensors 16 can also provide document position information to the inspection engine 12. The inspection engine 12 uses this information to trigger capture of an image of a region under inspection of a current document by the optical imaging system 13. A content analyzer included in the inspection engine compares the actual content of the region under inspection as represented by the captured image with the desired content extracted from the print datastream 3 using a comparator. The actual and desired content being analyzed can be print characteristics of the region under inspection, such as print density, but is preferably alphanumeric or barcode information that varies from document to document.

We prefer to mount an optical sensor 17, such as an aimable or fixed digital camera or other image capture device, of the optical imaging system 13 in the printer 2 at a location where it has a clear view of the documents being printed. The optical sensor 17 can also be mounted in the print media out equipment 5, the finishing system 6, or any other appropriate location with a suitable view of the printed documents. The optical imaging system 13 captures images in accordance with instructions from the inspection engine 12 of the document inspection system 10. The inspection engine 12 preferably bases instructions on the location of the region under inspection and the document position. We prefer to use the optical sensor 17 of the optical imaging system to capture images of substantially only regions under inspection on the printed documents, but it is also possible to capture images of entire documents. However, we prefer to capture images of the regions under inspection because the images are much smaller and can be processed much more quickly than images of entire documents using current computer technology. Inasmuch as computer technology is advancing at a rapid pace, we foresee a time when images of entire documents can be processed with at least as much speed as that at which our preferred images are currently processed.

Thus, the printer 2 prints documents in accordance with instructions from the job controller 8, the input device 9 (if present), and the print datastream 3 on print media supplied by the print media feed equipment 4. The inspection system 10 monitors the position of each printed document; and when the respective region under inspection passes within appropriate range of the optical sensor 17, the optical imaging system 13 captures an image of the region under inspection. The inspection engine 12 then analyzes the captured image of the region under inspection and compares the actual content of the region under inspection to desired content of the region under inspection as extracted from the print datastream 3 by the pre-parser 11. If the desired and actual content differ by more than a predetermined extent, then the system takes an error indication or notation action, such as logging the discrepancy to a log file, displaying information about the discrepancy on a display, or stopping the print job. The predetermined extent can be any difference between actual and desired content or can be some suitable threshold, such as a percentage of error in the actual content.

Figure 2:
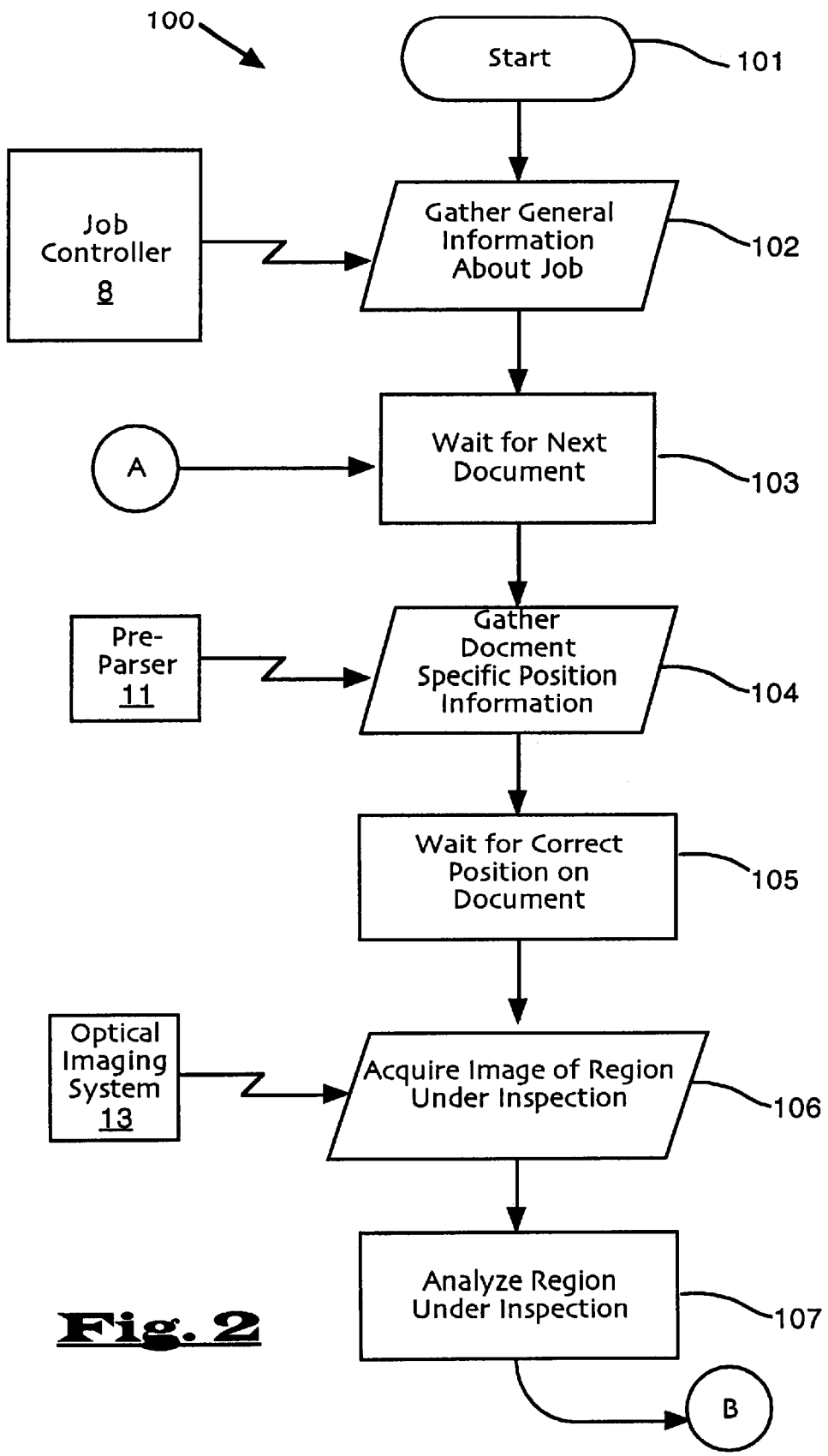
FIG. 2 is a schematic flow chart of a first portion of the method of our invention.
Figure 3:
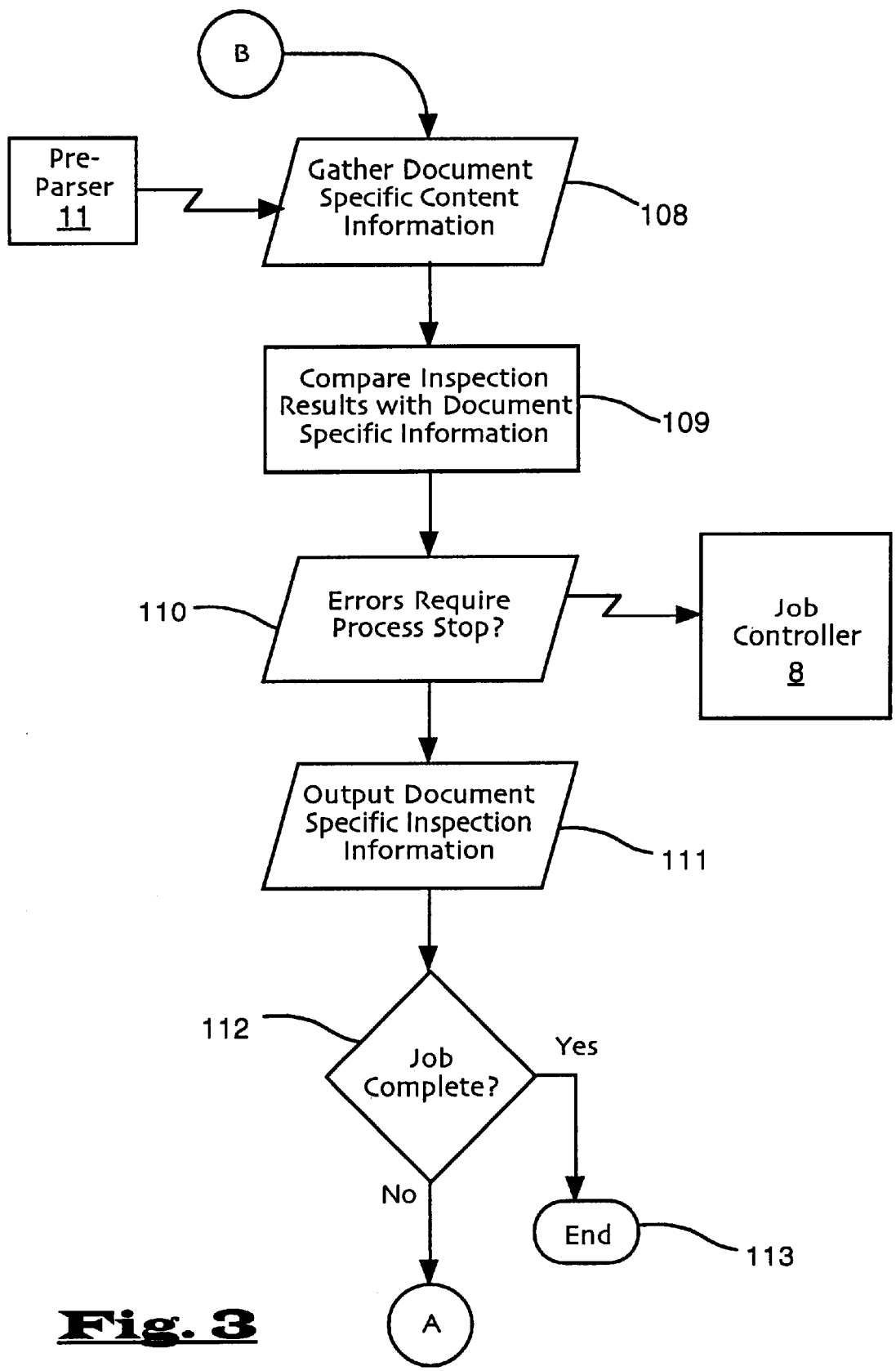
FIG. 3 is a schematic flow chart of a second portion of the method of our invention.
Figure 4:
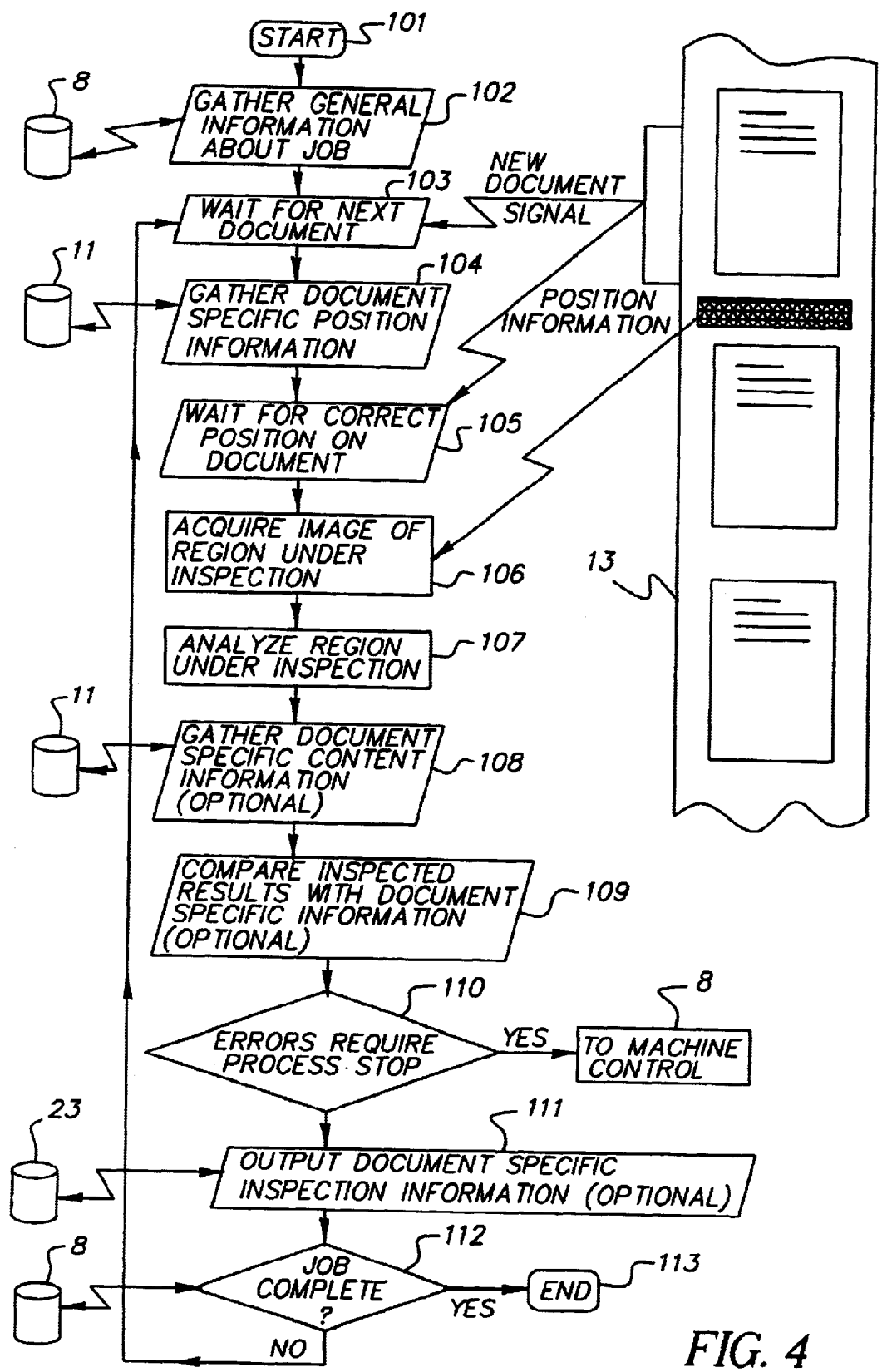
FIG. 4 is a schematic of the overall invention.

In use, our system runs in accordance with the method generally shown in FIGS. 2, 3, and 4. After start (block 101), general information about a print job is gathered (block 102) from sources such as the job controller 8. The system then waits for the first or next document (block 103) and gathers document specific position information (block 104) from sources such as the pre-parser 11. Next, the system waits for the document to reach a correct position (block 105) and acquires an image of the region under inspection (block 106) using the optical imaging system 13. The system then analyzes the region under inspection (block 107), gathers document specific content information (block 108), including desired content of the region under inspection, from sources including the pre-parser 11, and compares the inspection results with the document specific information (block 109). Next, the system determines whether there are errors that require stoppage of the process (block 110). If so, then the system sends a signal, such as an alarm signal, to stop the print job by sending a signal to the job controller 8. Alternatively, the system can simply note the discrepancy by recording it in a log file and proceed. In any case, the system outputs document specific inspection information (block 111), which can include the results of the comparison of desired and actual content, to an output device 23, such as a monitor or printer, or to a data file. Finally, our system checks whether the job is complete (block 112): if so, then the system ends the inspection process ("End" block 113); otherwise, the process begins anew with the system waiting for the next document (block 103).

We claim:

1. In a printing system including a print server, a printer, print media feed and take-up equipment, and document position sensors, a document inspection system including:
    a desired location determiner that determines a desired location of a region under inspection in a current document whose position is variable as between the current document and other documents in a given print job;
    the region under inspection being a region where desired content of the current document is supposed to appear;
    the desired content varying as between the current document and other documents in a given print job;
    a content analyzer that analyzes actual content in the region under inspection in a scanned image of the current document to determine whether errors have been made during printing of the current document; and
    an error indication system that takes an error notification action when errors have been made to a predetermined extent
    wherein the desired location determiner receives information concerning a change in the desired location of a region tinder inspection as between the current document and another of the documents in the given print job and the content analyzer analyzes the actual content in the changed-location region under inspection in a scanned image of the another of the documents to determine whether errors have been made in the another document.

2. The document inspection system of claim 1 wherein the desired content includes document specific desired content and the content analyzer further includes a content comparator that compares actual content of the region under inspection to the desired content.

3. The document inspection system of claim 1 wherein the error indication system acts and the predetermined extent is when the actual content differs from the desired content.

4. The document inspection system of claim 1 wherein the desired location determiner receives information concerning the change in the desired location of the region under inspection from a print datastream sent from the print server both to the printer and to the desired location determiner.

5. The document inspection system of claim 1 wherein the desired location determiner receives information concerning the change in the desired location of the region under inspection from a print data file that is accessed by both the printer and the desired location determiner.

6. The document inspection system of claim 1 wherein the document inspection system monitors documents in the printer.

7. The document inspection system of claim 1 wherein the document inspection system monitors documents at print media out equipment that receives the printed documents.

8. The document inspection system of claim 1 wherein the optical imaging system includes an aimable camera and the document inspection system instructs the camera to aim itself at the region under inspection.

9. The document inspection system of claim 1 wherein the print server receives the error signal and stops the printer in response thereto.

10. In a printing system including a print server, a printer, print media feed and take-up equipment and document position sensors, a document inspection system including:
    a desired location determiner that determines a desired location of a region under inspection in a current document whose position is variable as between the current document and other documents in a given print job;
    the region under inspection being a region where desired content of the current document is supposed to appear;
    the desired content varying as between the current document and other documents in a given print job;
    a content analyzer that analyzes actual content in the region under inspection in a scanned image of the current document to determine whether errors have been made during printing of the current document; and
    an error indication system that takes an error notification action when errors have been made to a predetermined extent,
    wherein the printing system further includes a finishing system and the document inspection system monitors documents in the finishing system.

11. In a printing system including a print server, a printer, print media feed and take-up equipment, and document position sensors, a document inspection system including;
    a desired location determiner that determines a desired location of a region under inspection in a current document whose position is variable as between the current document and other documents in a given print job;
    the region under inspection being a region where desired content of the current document is supposed to appear;
    the desired content varying as between the current document and other documents in a given print job;
    a content analyzer that analyzes actual content in the region under inspection in a scanned image of the current document to determine whether errors have been made during printing of the current document; and
    an error indication system that takes an error notification action when errors have been made to a predetermined extent,
    wherein the desired location is flagged during creation of the current document using document creation software.

12. The document inspection system of claim 11 wherein the desired location is flagged using a plug-in for the document creation software.

13. In a printing system including a print server, a printer, print media feed and take-up equipment, and document position sensors, a document inspection system including:
    a desired location determiner that determines a desired location of a region under inspection in a current document whose position is variable as between the current document and other documents in a given print job;
    the region under inspection being a region where desired content of the current document is supposed to appear;
    the desired content varying as between the current document and other documents in r given print job;
    a content analyzer that analyzes actual content in the region under inspection in a scanned image of the current document to determine whether errors have been made during printing of the current document; and
    an error indication system that takes an error notification action when errors have bean made to a predetermined extent,
    wherein the document inspection system further includes a pre-parser that receives the print data and that sends inspection information in the print data to the document inspection system.

14. The document inspection system of claim 13 wherein the inspection information includes particular characteristics of the region under inspection and is used by the desired location determiner to determine the desired location for the region under inspection on the basis of results of its search.

15. In a printing system, a method of document inspection including the steps of:
   providing a print server that sends print jobs to a printer, the print jobs including documents of varying content;
   substantially confining the varying content to a variable region under inspection on each document;
   determining a desired location of the variable region under inspection of a current document of the print job, the desired location of the variable region under inspection varying relative to variable regions under inspection of other documents of the same print job;
   comparing actual content in the region under inspection in a captured image of the current document to desired content that is supposed to be in the region under inspection;
   acquiring information concerning a change in the desired location of the variable region under inspection between documents of the same print job;
   comparing actual content in the changed-location region under inspection in a captured image of another document to desired content that is supposed to he in the changed-location region under inspection; and
   initiating a discrepancy notation action when the actual content is different from the desired content.

16. The method of claim 15 further including the step of determining a size of the region under inspection of a current document of the print job, the size of the region under inspection varying relative to other documents of the same print job.

17. The method of claim 15 wherein the printing system further includes an optical imaging system that captures the captured image of the current document and the step of comparing the actual content to the desired content includes the step of receiving the captured image from the optical imaging system.

18. The method of claim 17 wherein the method further includes the step of timing capture of the image of the current document by the optical imaging system so that substantially only the region under inspection appears in the captured image.

19. The method of claim 17 wherein the method further includes the step of capturing substantially the entire document as the captured image.

20. The method of claim 15 wherein the step of initiating a discrepancy notation action includes sending an alarm signal.

21. The method of claim 15 wherein the step of initiating a discrepancy notation action includes writing the discrepancy to a log file.

22. The method of claim 15 wherein the step of initiating a discrepancy notation action includes stopping the print job.

23. In a printing system, a method of document inspection including the steps of:
   providing a print server that sends print jobs to a printer, the print jobs including documents of varying content;
   substantially confining the varying content to a variable region under inspection on each document;
   determining a desired location of the variable region under inspection of a current document of the print job, the desired location of the variable region under inspection varying relative to variable regions under inspection of other documents of the same print job;
   comparing actual content in the region under inspection in a captured image of the current document to desired content that is supposed to he in the region under inspection; and
   initiating a discrepancy notation action when the actual content is different from the desired content;
   wherein the step of determining a desired location of a respective region under inspection in a document includes the steps of:
      receiving document printing data for the current document including region under inspection flags, the region under inspection flags demarcating the boundaries of the region under inspection; and
      extracting the desired location from the document printing data using the region under inspection flags.

24. The method of claim 23 wherein the document printing data is included in a print job datastream sent from the print server to the printer.

25. The method of claim 23 wherein the document printing data is included in a print data file.

26. In a printing system that executes print jobs to print documents, a document inspection method capable of inspecting document content in varying locations from document to document in a given print job, the method including the steps of:
   receiving general information about a print job from a print server;
   waiting for a current document of the print job;
   receiving a new document signal from a new document sensor when the current document reaches an inspection station;
   receiving document specific position information from the print server, the document specific position information including a position of a region under inspection;
   waiting for a document to reach a correct position as indicated by a position sensor;
   receiving an image of the region under inspection from an optical imaging system;
   analyzing the region under inspection to obtain inspected results;
   determining whether any discrepancies merit stopping the print job;
   stopping the print job if discrepancies do merit stopping the print job;
   checking the general print job content to determine whether the print job is complete;
   repeating the steps of waiting for a current document through checking the general print job content to determine whether the print job is complete until the print job is complete; and
   ending the print job if the print job is complete.

27. The method of claim 26 wherein the step of analyzing the region under inspection includes the step of analyzing print quality so that the inspected results includes an assessment of print quality in the region under inspection and the step of determining whether any discrepancies merit stopping the print job includes the step of comparing the inspected results to a predetermined print quality threshold.

28. The method of claim 26 further including the steps of:
   receiving document specific content; and
   comparing the inspected results with the document specific content to obtain an error percentage.

29. The method of claim 28 wherein the step of determining whether any discrepancies merit stopping the print job includes comparing the error percentage to a predetermined error percentage threshold.

30. The method of claim 26 further including the step of sending document specific inspection content to the print server.

31. A method of document inspection including:
   a. monitoring a series of printed documents, each of the printed documents including a region under inspection whose location varies from document to document;
   b. receiving an image of the region under inspection for a current document;
   c. analyzing the image of the region under inspection by determining whether the region under inspection meets predetermined criteria;
   d. acquiring information concerning a change in the location of the region under inspection between documents of the series;
   e. receiving an image of the changed-location region under inspection for another document of the series;
   f. analyzing the image of the changed-location region under inspection by determining whether the changed-location region under inspection meets the predetermined criteria; and
   g. taking an error notification action when the predetermined criteria are not met.

32. The method of claim 31 wherein the region under inspection includes variable content that is specific to a given document.

33. The method of claim 31 wherein the step of receiving an image of the region under inspection includes the step of capturing an image of the region under inspection with an optical imaging system.

34. The method of claim 33 wherein the step of monitoring a series of printed documents includes the step of determining a location of the region under inspection on the document and the step of capturing an image of the region under inspection includes capturing an image of substantially only the region under inspection.

35. The method of claim 33 wherein the step of monitoring a series of printed documents includes the step of determining a location of the region under inspection and the step of capturing an image of the region under inspection includes the steps of capturing an image of the entire current document and using the location of the region under inspection to examine substantially only the region under inspection.

36. The method of claim 31 wherein the step of acquiring information concerning the change in the location of the region under inspection between documents of the series includes receiving a print datastream including data used to print the printed documents.

37. The method of claim 31 wherein the step of acquiring information concerning the change in the location of the region under inspection between documents of the series includes accessing a data file including print data used to print the printed documents.

* * * * *